(12) United States Patent
Lee et al.

(10) Patent No.: US 10,611,319 B2
(45) Date of Patent: Apr. 7, 2020

(54) DOOR TRIM COUPLING DEVICE FOR A VEHICLE

(71) Applicants: Hyundai Motor Company, Seoul (KR); Kia Motors Corporation, Seoul (KR); Duck Yang Industry Co., Ltd., Ulsan (KR)

(72) Inventors: Jaeseung Lee, Hwaseong-si (KR); Sun gu Lee, Suwon-si (KR); Sae Hoon Oh, Ulsan (KR); Hun Sub Jeong, Ulsan (KR); seung ho Kim, Ulsan (KR)

(73) Assignees: Hyundai Motor Company, Seoul (KR); Kia Motors Corporation, Seoul (KR); Duck Yang Industry Co., Ltd., Ulsan (KR)

( * ) Notice: Subject to any disclaimer, the term of this patent is extended or adjusted under 35 U.S.C. 154(b) by 431 days.

(21) Appl. No.: 15/602,437

(22) Filed: May 23, 2017

(65) Prior Publication Data

US 2018/0170281 A1 Jun. 21, 2018

(30) Foreign Application Priority Data

Dec. 16, 2016 (KR) .......................... 10-2016-0172938

(51) Int. Cl.
*B60R 13/02* (2006.01)
*B60J 5/04* (2006.01)

(52) U.S. Cl.
CPC ...... *B60R 13/0206* (2013.01); *B60R 13/0243* (2013.01)

(58) Field of Classification Search
CPC .................. B60R 13/0206; B60R 13/0243
See application file for complete search history.

(56) References Cited

U.S. PATENT DOCUMENTS

| 6,289,558 | B1 | 9/2001 | Hammerslag |
| 7,591,050 | B2 | 9/2009 | Hammerslag |
| 7,950,112 | B2 | 5/2011 | Hammerslag et al. |
| 7,954,204 | B2 | 6/2011 | Hammerslag et al. |
| 7,992,261 | B2 | 8/2011 | Hammerslag et al. |
| 8,091,182 | B2 | 1/2012 | Hammerslag et al. |
| 8,277,401 | B2 | 10/2012 | Hammerslag et al. |
| 2016/0031385 | A1* | 2/2016 | Lee ..................... B60R 13/0243 24/289 |

FOREIGN PATENT DOCUMENTS

KR 10-1575508 B1 12/2015

OTHER PUBLICATIONS

US 7,516,521 B2, 04/2009, Hammerslag (withdrawn)

* cited by examiner

*Primary Examiner* — Robert Sandy
*Assistant Examiner* — David M Upchurch
(74) *Attorney, Agent, or Firm* — Morgan, Lewis & Bockius LLP

(57) ABSTRACT

A door trim coupling device for a vehicle may include a wire provided in a closed loop form, a locking device disposed in a door trim of the vehicle and configured to selectively wind or unwind the wire, and a mounting device disposed in the door trim and configured to be engaged with or disengaged from a door panel of the vehicle by winding or unwinding of the wire, wherein the mounting device includes a pulley provided to be rotatable and configured to wind or unwind the wire according to a rotation direction of the pulley, and a clutch configured to allow the pulley to rotate in one direction and to prevent the pulley from rotating in the other direction opposite to the one direction.

10 Claims, 15 Drawing Sheets

DOOR TRIM COUPLING DEVICE FOR A VEHICLE

CROSS-REFERENCE TO RELATED APPLICATION

The present application claims priority to Korean Patent Application No. 10-2016-0172938, filed on Dec. 16, 2016, the entire contents of which is incorporated herein for all purposes by this reference.

BACKGROUND OF THE INVENTION

Field of the Invention

The present invention relates to a door trim coupling device for a vehicle with improved assemblability and detachability using wires.

Discussion of Related Art

Generally, the door trim, which is internal of a vehicle door, provides a pleasant internal space and protects the components. and can be coupled to the inside of the door internal panel.

Conventionally, the door trim can be coupled to the door internal panel using a fastener. Specifically, the fastener was mounted on the door trim, and such a fastener was inserted into the insertion hole provided in the door internal panel, so that the door trim may be coupled to the door internal panel. A physical load had to be applied to insert the fastener into the insertion hole, and the fastener was shrink-fitted into the insertion hole by the physical load.

According to the above-described conventional structure, the insertion force required to insert the fastener into the insertion hole is large, and the assemblability is poor.

Further, to detach the door trim from the door internal panel, the fastener that had been shrink-fitted into the insertion hole had to be pulled out from the insertion hole by physical load. The physical load, that is, the detachment force, is much greater than the insertion force, and the detachability is very poor.

In addition, during the detachment of the door trim, deformation of the fastener and the door internal panel occurs, which necessitates replacement of the fastener or rework of the internal panel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention provide a door trim coupling device for a vehicle with improved assemblability and detachability.

Various aspects of the present invention are directed to providing a door trim coupling device for a vehicle designed to prevent deformation of a door internal panel when a door trim is detached.

In accordance with one aspect of the present invention, a door trim coupling device for a vehicle including a wire provided in a closed loop form, a locking device disposed in a door trim of the vehicle and configured to selectively wind or unwind the wire, and a mounting device disposed in the door trim and configured to be engaged with or disengaged from a door panel of the vehicle by winding or unwinding of the wire, wherein the mounting device includes a pulley provided to be rotatable and configured to wind or unwind the wire according to a rotation direction of the pulley, and a clutch configured to allow the pulley to rotate in one direction and to prevent the pulley from rotating in the other direction opposite to the one direction.

The clutch may include a first clutch and a second clutch selectively connectable to the pulley, and the first clutch may allow the pulley to rotate in a first direction and prevent the pulley from rotating in a second direction opposite to the first direction and the second clutch may prevent the pulley from rotating in the first direction and allow the pulley to rotate in the second direction.

The locking device may further include a clutch housing to which the first clutch and the second clutch are coupled to each other, and the clutch housing may be configured to be selectively positioned at a first position in which the first clutch is connected to the pulley or at a second position in which the second clutch is connected to the pulley.

The locking device may further include an upper housing to which the clutch housing is coupled, and the upper housing may include a first positioning groove for positioning the clutch housing in the first position and a second positioning groove for positioning the clutch housing in the second position.

The clutch housing may include a positioning protrusion configured to be selectively inserted into one of the first positioning groove and the second positioning groove.

The wire may include a first wire and a second wire, each of which forms a separate closed loop, and when the first wire is wound around the pulley, the second wire may be unwound from the pulley and when the first wire is unwound from the pulley, the second wire may be wound around the pulley.

When the pulley rotates in the first direction, the first wire may be wound around the pulley and when the pulley rotates in a second direction opposite to the first direction, the first wire may be unwound from the pulley.

The locking device may further include a tightening bolt configured to be movable in an axial direction, and the tightening bolt may be configured to move in the axial direction to selectively engage with the pulley and the tightening bolt engaged with the pulley may be configured to rotate together with the pulley.

The locking device may further include a clip, and the clip may be selectively fitted in a pair of clip grooves provided at an axially upper side and an axially lower side of the tightening bolt.

The locking device may further include a lower housing disposed in the door trim and including a through hole provided to be penetrated by the tightening bolt, and a c-ring coupled to one end portion of the tightening bolt to prevent the tightening bolt from being separated from the through hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
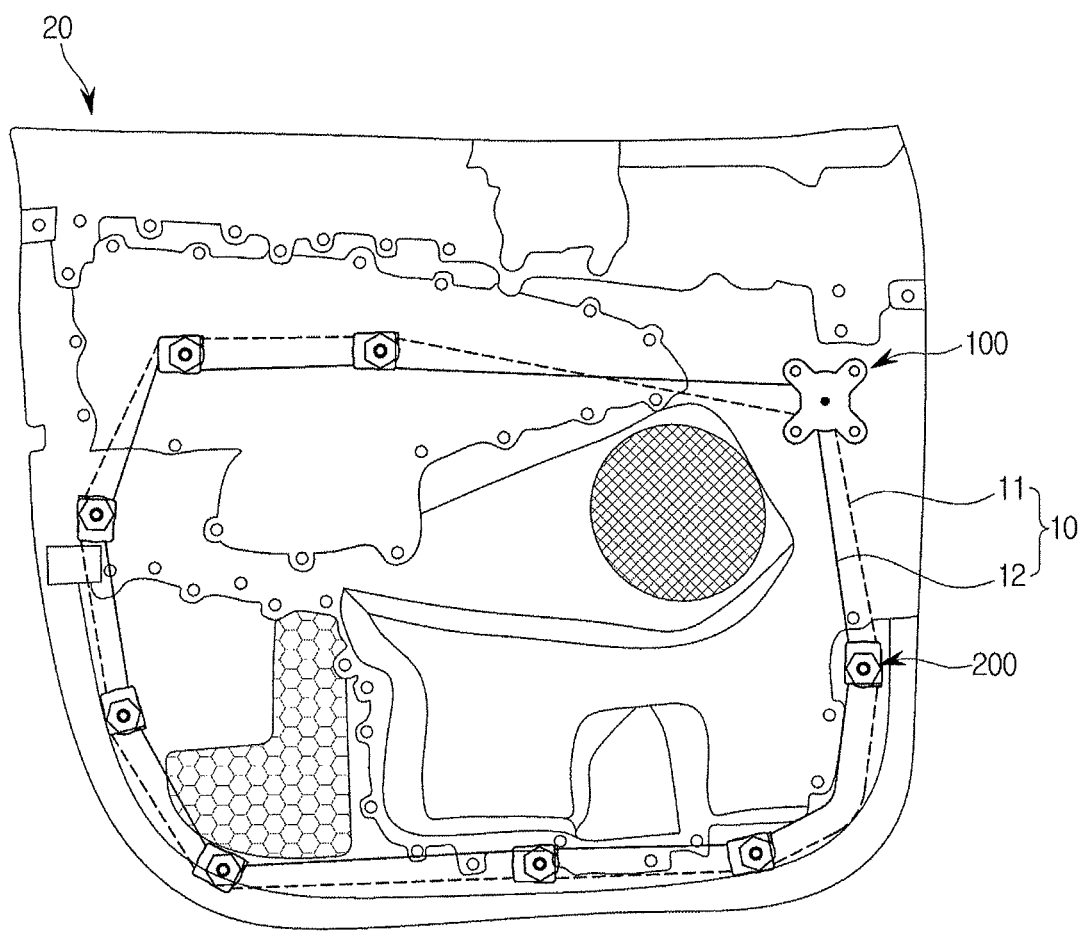
FIG. 1 is a view illustrating a door trim coupling device for a vehicle according to an exemplary embodiment of the present invention mounted on a door trim of the vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In addition, the same reference numerals or symbols shown in the drawings of the present specification indicate components or components that perform substantially the same function.

Also, the terms used herein are used to illustrate the embodiments and are not intended to limit and/or limit the included invention. The singular forms "a," "an," and "the" include plural referents unless the context clearly dictates otherwise.

In the present specification, the terms "comprise", "having", and the like are used to specify that a feature, a number, a step, an operation, an element, a component, or a combination thereof, But do not preclude the presence or addition of one or more features, integers, steps, operations, elements, components, or combinations thereof.

It is also to be understood that terms including ordinals including "first", "second" and the like used herein may be used to describe various elements, but the elements are not limited to the terms, it is used only for distinguishing one component from another. For example, the first component may be referred to as a second component, and similarly, the second component may also be referred to as a first component. The term "and/or" includes any combination of a plurality of related listed items or any of the plurality of related listed items.

The terms "front", "rear", "upper" and "lower" used in the following description are defined based on the drawings, and the shape and position of each component are not limited by these terms.

In the following description, a vehicle refers to various devices that move a vehicle body including a human being, a thing, or an animal, from a departure point to a destination. Vehicles may include vehicles that run on roads or tracks, ships that move over the sea or river, and airplanes that fly through the sky using air.

Further, a vehicle running on a road or a track can move in a predetermined direction in accordance with the rotation of at least one wheel, and can include a three-wheeled or four-wheeled vehicle, a construction machine, a two-wheeled vehicle, a prime mover, bicycles and trains running on the track.

Hereinafter, embodiments according to an exemplary embodiment of the present invention will be described in detail with reference to the accompanying drawings.

Figure 2:
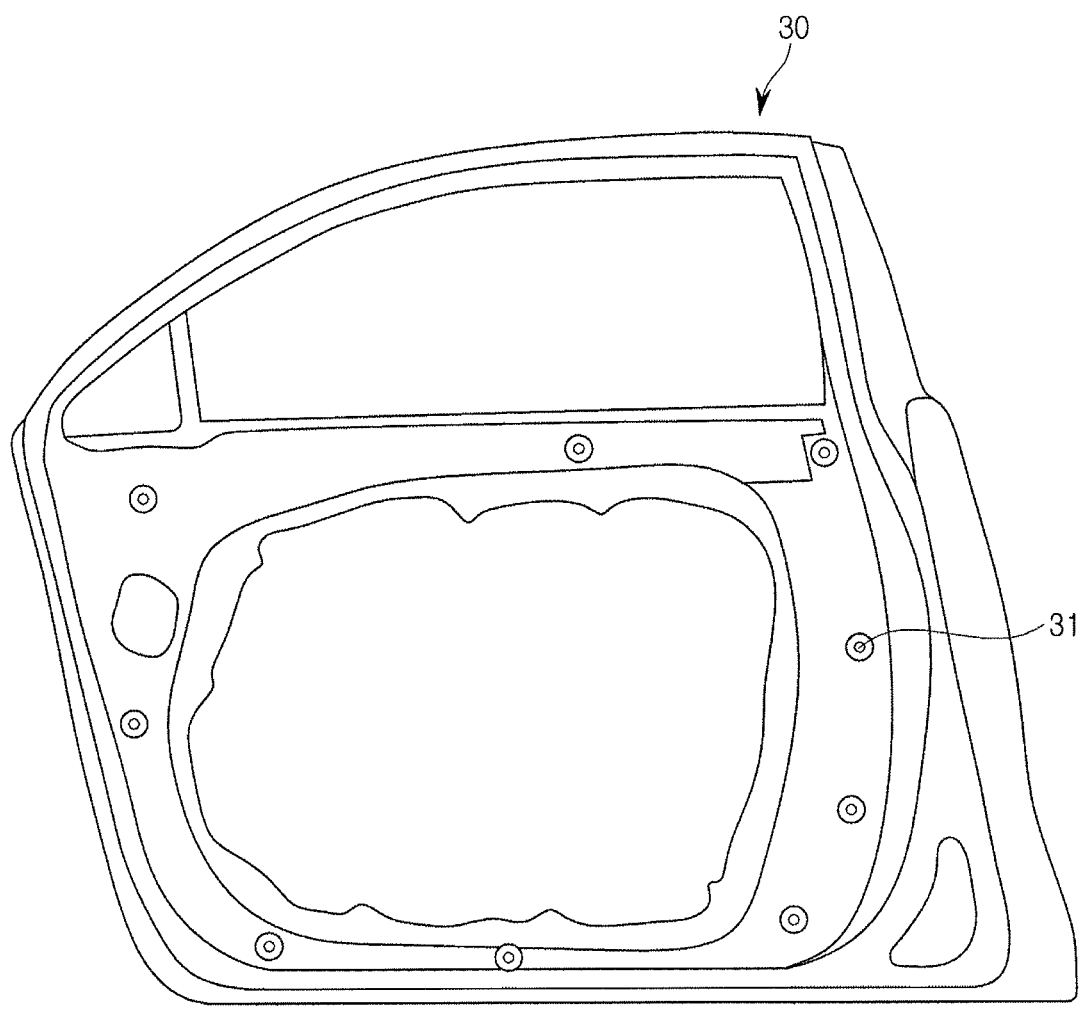
FIG. 2 is a view illustrating a door panel of a vehicle according to an exemplary embodiment of the present invention.

As shown in FIG. 1 and FIG. 2, the door trim coupling device for a vehicle according to an exemplary embodiment of the present invention includes a wire 10 provided in a closed loop form, a locking device 100 disposed on the door trim 20 and configured to wind or unwind the wire 10, and a mounting device 200 disposed on the door trim 20 and configured to be engaged or disengaged from the door panel 30 of the vehicle by winding or unwinding of the wire 10.

The wire 10 may include a first wire 11 and a second wire 12, each of which forms a separate closed loop. The first wire 11 and the second wire 12 may connect between the locking device 100 and the mounting device 200. In other words, the locking device 100 and the mounting device 200 can be connected by the wire 10.

The locking device 100 may be disposed at one side of the door trim 20. The locking device 100 may be provided to wind or unwind the first wire 11 or the second wire 12. The locking device 100 can adjust the length of the closed loop formed by the first wire 11 and the second wire 12, respectively. More specifically, when the locking device 100 winds the first wire 11, the first wire 11 is wound on a pulley provided in the locking device 100, the length of the closed loop of the first wire 11 is shortened. Conversely, when the locking device 100 winds the second wire 12, the second wire 12 is wound on a pulley provided in the locking device 100, the length of the closed loop of the second wire 12 is shortened. When the first wire 11 is wound on the pulley of the locking device 100, the second wire 12 is unwounded from the pulley. Similarly, when the second wire 12 is wound on the pulley of the locking device 100, the first wire 11 is unwounded from the pulley. The closed loop may mean the length of the first wire 11 and the second wire 12 with respect to the locking device 100.

The mounting device 200 may be disposed in the door trim 20. The mounting device 200 may be provided in plurality along the rim portion of the door trim 20. When the number of the mounting units 200 is increased, the coupling force between the door trim 20 and the door panel 30 can be increased.

The mounting device 200 may be provided to be engaged or disengaged with the door panel 30 of the vehicle by winding or unwinding of the wire 10. when the first wire 11 is wound on the locking device 100, the mounting device 200 may be provided to engage with the bolt 31 provided on the door panel 30. Conversely, when the second wire 12 is wound on the locking device 100, the mounting device 200 may be provided to be disengaged from the bolt 31.

Therefore, according to the exemplary embodiment of the present invention, the first wire 11 and the second wire 12 can be wound or unwound through the locking device 100, whereby the closed loop length of the first wire 11 and the closed loop length of the second wire 12 can be adjusted. The mounting device 200 can be engaged or disengaged with the door panel 30 by adjusting the closed loop length of the first wire 11 or the second wire 12.

That is, only by operating the locking device 100, the mounting device 200 can be easily coupled with the door panel 30, and the mounting device 200 and the door panel 30 can be disengaged. Therefore, the insertability and detachability can be significantly improved as compared with the method of joining the door panel with the door trim through the fastener. Further, there is no fear that the door panel 30 is broken in a process of joining or disengaging the mounting device 200 and the door panel 30. Therefore, it is possible to prevent the occurrence of door panel breakage and the occurrence of rework due to detachment of the door trim.

Figure 3:
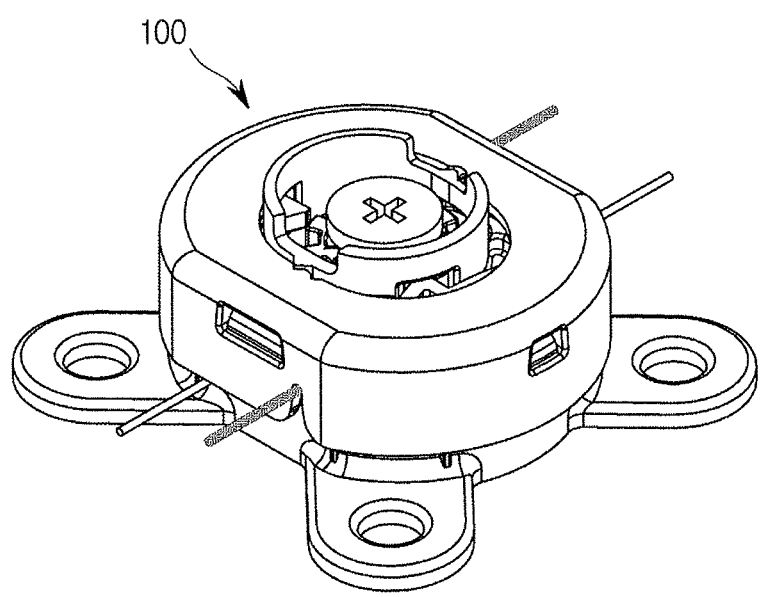
FIG. 3 is a view illustrating a locking device in a door trim coupling device for a vehicle according to an exemplary embodiment of the present invention.
Figure 4:
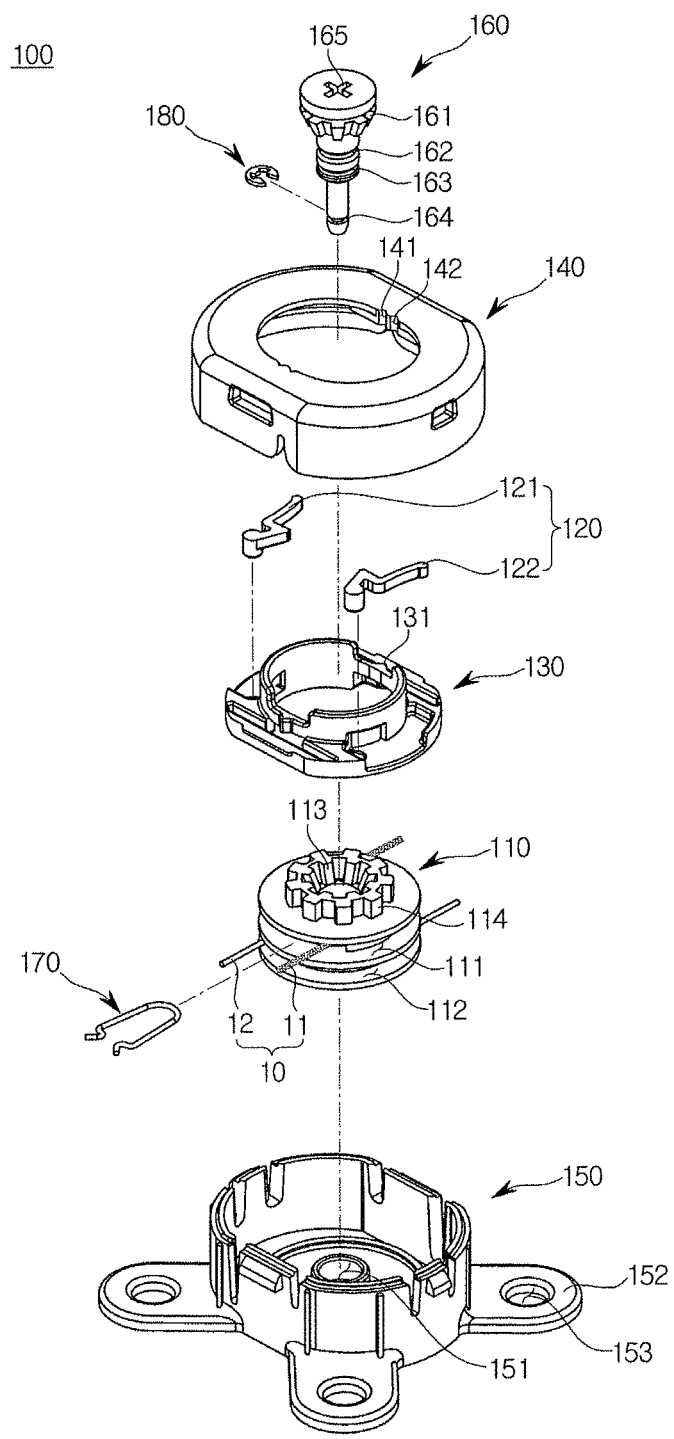
FIG. 4 is an exploded view of the locking device shown in FIG. 3.

FIG. 3 is a view illustrating a locking device in a door trim coupling device for a vehicle according to an exemplary embodiment of the present invention and FIG. 4 is an exploded view of the locking device shown in FIG. 3.

Hereinafter, a locking device according to an exemplary embodiment of the present invention will be described in detail with reference to FIG. 3 and FIG. 4.

According to an exemplary embodiment of the present invention, the locking device 100 includes a pulley 110 provided to be rotatable and configured to wind or unwind a wire 10 in a according to a rotation direction of the pulley, a clutch configured to allow the pulley in one direction and prevent the pulley from rotating in the other direction opposite to the one direction.

The pulley 110 may be provided to be rotatable and may be configured to wind or unwind the wire 10 according to a rotation direction of the pulley 110. The pulley 110 may be provided to be rotatable in a first direction and in a second direction opposite to the first direction. When the pulley 110 rotates in the first direction, the pulley 110 may be provided to wind the wire 10. When the pulley 110 rotates in the second direction, the pulley 110 may be provided to unwind the wire 10. Alternatively, when the pulley 110 rotates in the first direction, the wire 10 may be provided to be unwound. In the present specification, the first direction and the second direction do not denote specific directions, but merely indicate the order for convenience of explanation. Details of winding or unwinding of the wire 10 as the pulley 110 is rotated will be described later.

The pulley 110 may include an internal gear portion 113 and an external gear portion 114 provided on an upper surface of the pulley 110. The internal gear portion 113 may be provided to engage with a bolt gear portion 161 of a tightening bolt 160 to be described later. The external gear portion 114 may be provided to be selectively connectable to the clutch 120.

The clutch 120 may be provided to allow the pulley 110 to rotate in one direction and to prevent the pulley 110 from rotating in the other direction opposite to the one direction.

The clutch 120 may include a first clutch 121 and a second clutch 122 that are selectively connectable to the external gear portion 114 of the pulley 110.

The first clutch 121 may allow the pulley 110 to rotate in the first direction and prevent the pulley 110 from rotating in the second direction opposite to the first direction. The second clutch 122 may allow the pulley 110 to rotate in the second direction and prevent the pulley 110 from rotating in the first direction. That is, the rotational direction of the pulley 110, which the first clutch 121 allows or prevents, and the rotational direction of the pulley 110 that the second clutch 122 allows or prevents may be opposite to each other. The specific operation of the clutch 120 will be described later.

Figure 5:
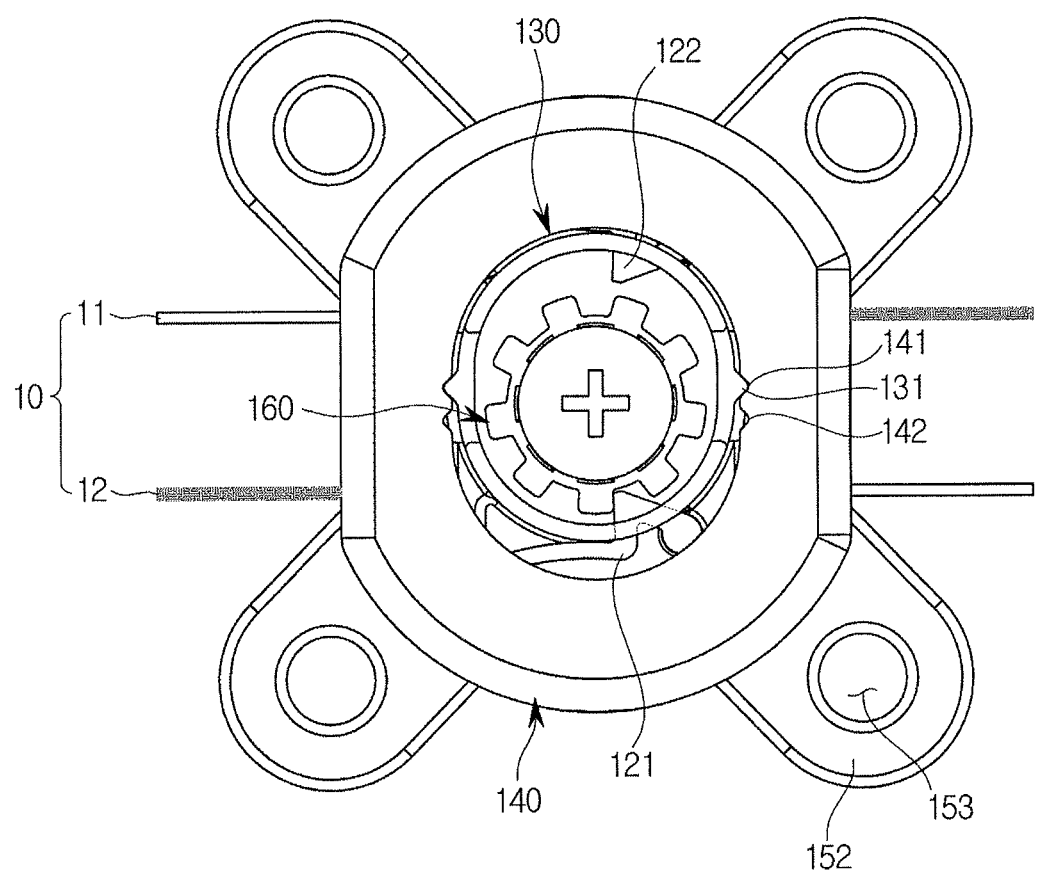
FIG. 5 is a plan view of the locking device shown in FIG. 3, illustrating a clutch housing in first position thereof.
Figure 6:
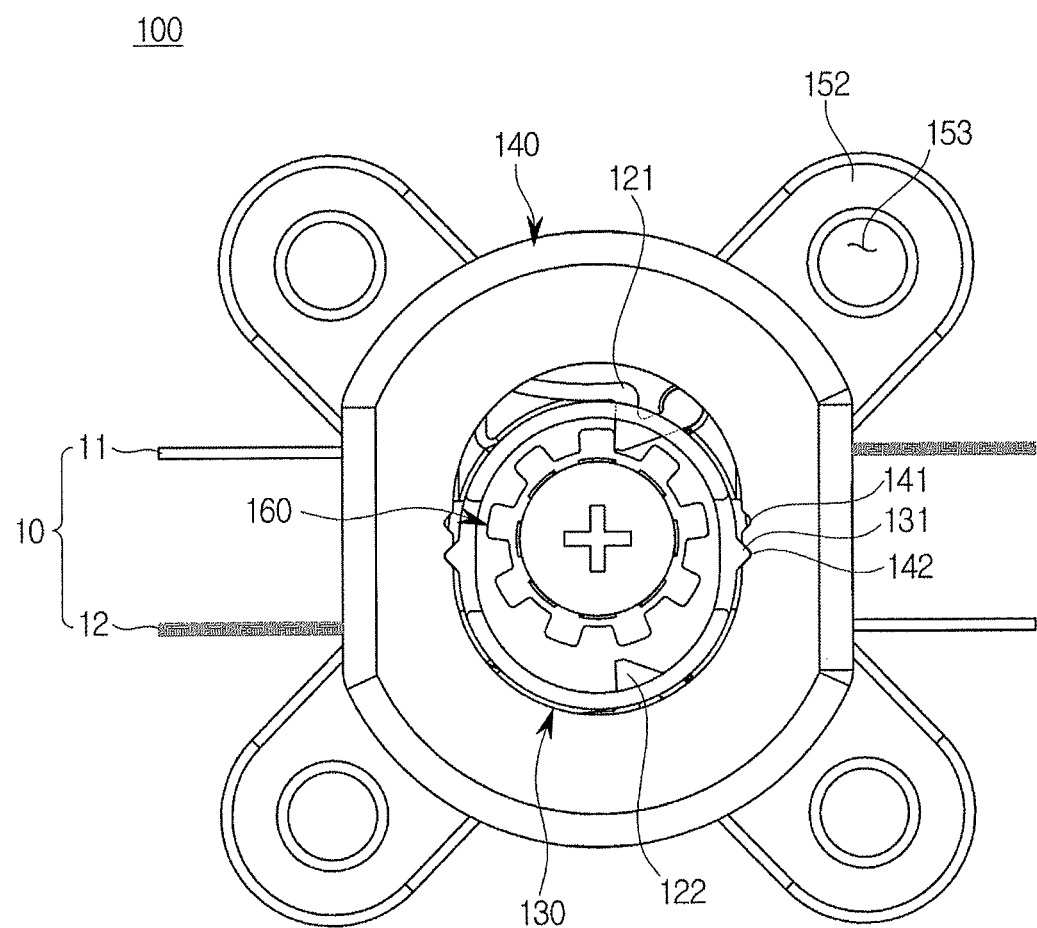
FIG. 6 is a plan view of the locking device shown in FIG. 3, illustrating a clutch housing in second position thereof.

FIG. 5 is a plan view of the locking device shown in FIG. 3, illustrating a clutch housing in first position thereof and FIG. 6 is a plan view of the locking device shown in FIG. 3, illustrating a clutch housing in second position thereof.

The locking device 100 may further include a clutch housing 130 to which the first clutch 121 and the second clutch 122 are coupled. The locking device 100 may further include an upper housing 140 to which the clutch housing 130 is coupled.

The clutch housing 130 may be selectively positioned in either a first position or a second position within the upper housing 140.

The upper housing 140 includes a first positioning groove 141 for positioning the clutch housing 130 in the first position within the upper housing 140 and a second positioning groove 142 positioning the clutch housing 130 in the second position within the upper housing 140. The clutch housing 130 may include a positioning protrusion 131 selectively inserted into one of the first positioning groove 141 and the second positioning groove 142. Therefore, when the positioning protrusion 131 of the clutch housing 130 is inserted into the first positioning groove 141 of the upper housing 140, the clutch housing 130 can be positioned at the first position. Similarly, when the positioning protrusion 131 of the clutch housing 130 is inserted into the second positioning groove 142 of the upper housing 140, the clutch housing 130 can be positioned at the second position.

The clutch housing 130 may selectively connect one of the first clutch 121 and the second clutch 122 to the pulley 110. When the clutch housing 130 is in the first position, the first clutch 121 can be connected to the pulley 110, and when the clutch housing 130 is in the second position, the second clutch 122 can be connected to the pulley 110. As described above, when the first clutch 121 is connected to the pulley 110, the pulley 110 can only rotate in the first direction. When the second clutch 122 is connected to the pulley 110, the pulley 110 can only rotate in the second direction. That is, the user can adjust the rotational direction of the pulley 110 by adjusting the position of the clutch housing 130.

Figure 7A:
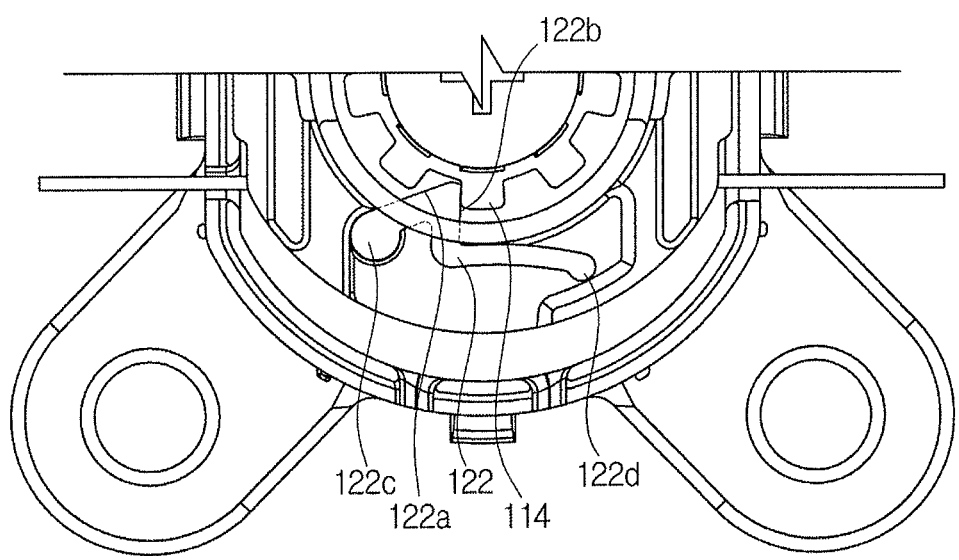
FIG. 7A and FIG. 7B are views illustrating the operation of a clutch in a door trim coupling device for a vehicle according to an exemplary embodiment of the present invention.
Figure 7B:
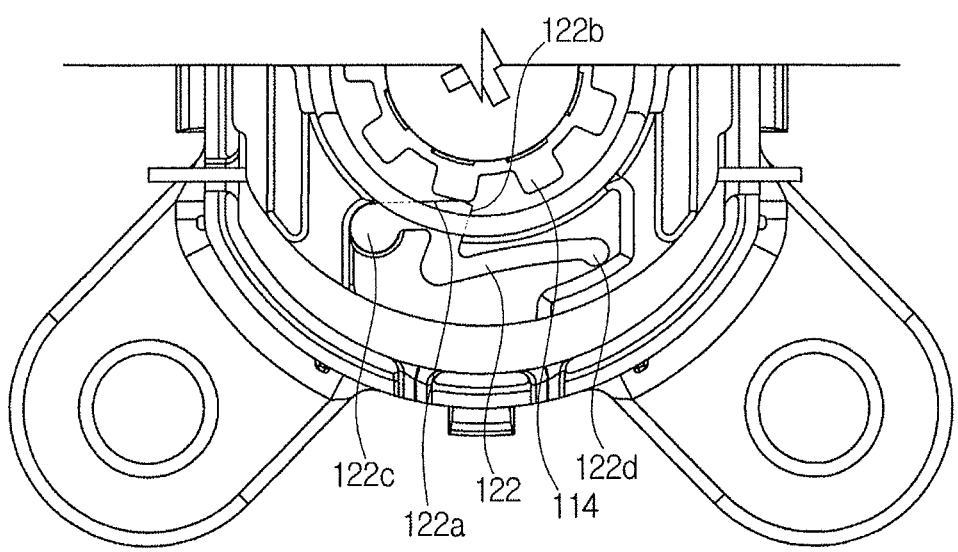

FIG. 7A and FIG. 7B are views illustrating the operation of a clutch in a door trim coupling device for a vehicle according to an exemplary embodiment of the present invention.

Hereinafter, the specific operation of the clutch will be described with reference to FIG. 7A and FIG. 7B. The operation of the clutch will be described taking the second clutch 122 as an example. Since the operation of the first clutch 121 is also the same as that of the second clutch 122, a detailed description thereof will be omitted.

The second clutch 122 may include an inclined surface 122a slidably contacting an external gear portion 114 of the pulley 110 and a vertical surface 122b provided in surface contact with the external gear portion 114 of the pulley 110 and a rotation shaft 122c that s configured as a center of rotation of the second clutch 122 and a sliding portion 122d configured to slidably move with respect to the clutch housing 130.

As shown in FIG. 7A, the vertical surface 122b can be in surface contact with the external gear portion 114. The rotation of the external gear portion 114 in a clockwise direction is restricted by the vertical surface 122b.

As shown in FIG. 7B, the external gear portion 114 may slide along the inclined surface 122a and can rotate in a counterclockwise direction. That is, the second clutch 122 may be provided to allow the pulley 110 to rotate in the counterclockwise direction and to prevent the pulley 110 from rotating in the clockwise direction. Although not shown in the drawings, the first clutch 121 may be provided to allow the pulley 110 to rotate in the clockwise direction and to prevent the pulley 110 from rotating in the counterclockwise direction.

Figure 8:
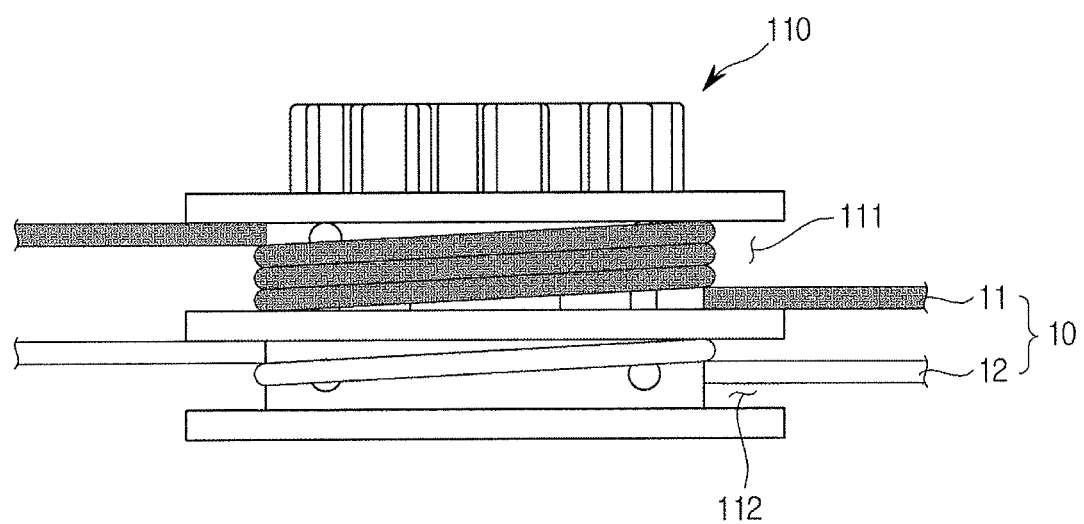
FIG. 8 and FIG. 9 are views illustrating winding and unwinding of a wire according to rotation of a pulley in a door trim coupling device for a vehicle according to an exemplary embodiment of the present invention.
Figure 9:
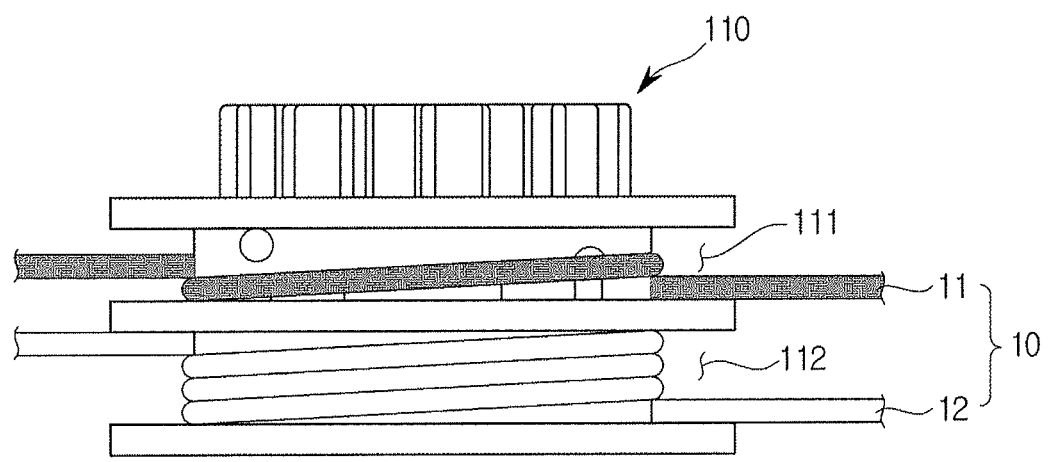

FIG. 8 and FIG. 9 are views illustrating winding and unwinding of a wire according to rotation of a pulley in a door trim coupling device for a vehicle according to an exemplary embodiment of the present invention.

The wire 10 may include a first wire 11 and a second wire 12, each of which forms a separate closed loop. The first wire 11 may be wound or unwound around the pulley upper end portion 111 and the second wire 12 may be wound or unwound around the pulley lower end portion 112.

When the first wire 11 is wound around the pulley upper end portion 111, the second wire 12 may be unwound from the pulley lower end portion. Conversely, when the second wire 12 is wound around the pulley lower end portion 112, the first wire 11 may be unwound from the pulley upper end portion 111.

When the first wire 11 is wound around the pulley upper end portion 111, the length of the closed loop formed by the first wire 11 is reduced. At this time, the length of the closed loop formed by the first wire 11 may indicate the length of the first wire 11 forming the closed loop with respect to the locking device 100. The length of the first wire 11 is constant and the length of the first wire 11 wound around the pulley 110 is increased so that the length of the first wire 11 excluding the length wound around the pulley 110 is reduced.

Likewise, when the second wire 12 is wound around the pulley lower end portion 112, the length of the closed loop formed by the second wire 12 is reduced.

As described above, the first wire 11 is wound around or unwound from the pulley upper end portion 111 of the pulley according to the rotation direction of the pulley 110 and at the same time the second wire 11 is unwound from or wound around the pulley lower end portion 112. That is, according to the idea of the present invention, the length of the first wire 11 or the second wire 12 can be adjusted by rotating the pulley 110 after determining the rotation direction of the pulley 110. In this way, the mounting device 200 can be engaged with or disengaged from the door panel 30.

Figure 10:
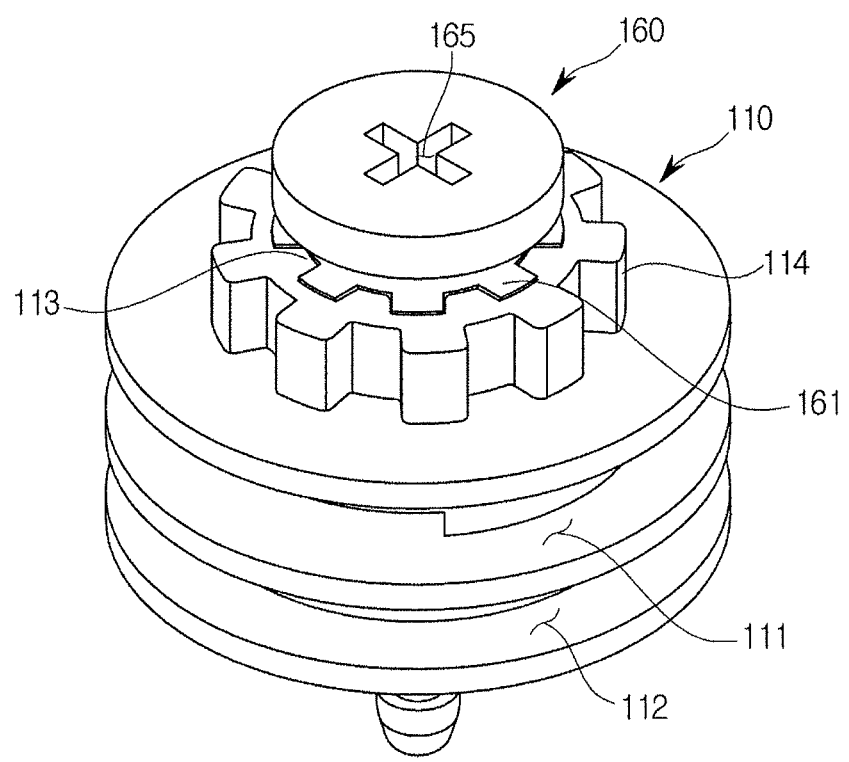
FIG. 10 is a view illustrating a state in which a tightening bolt and a pulley are engaged in a door trim coupling device for a vehicle according to an exemplary embodiment of the present invention.
Figure 11:
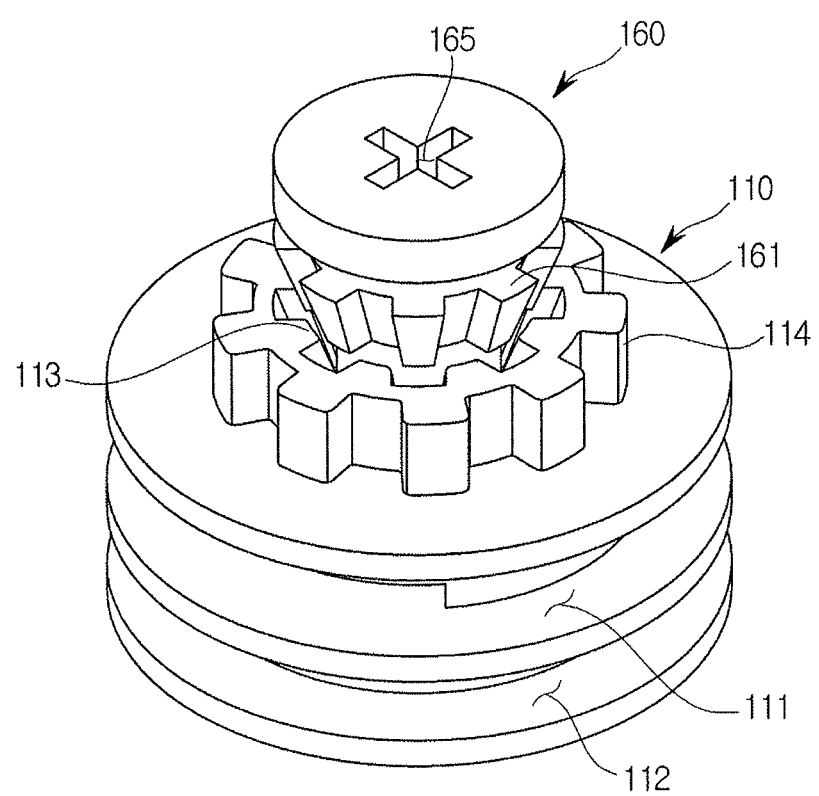
FIG. 11 is a view illustrating a state in which a tightening bolt and a pulley are disengaged in a door trim coupling device for a vehicle according to an exemplary embodiment of the present invention.

FIG. 10 is a view illustrating a state in which a tightening bolt and a pulley are engaged in a door trim coupling device for a vehicle according to an exemplary embodiment of the present invention and FIG. 11 is a view illustrating a state in which a tightening bolt and a pulley are disengaged in a door trim coupling device for a vehicle according to an exemplary embodiment of the present invention.

The locking device 100 may further include a tightening bolt 160 configured to be movable in an axial direction. The tightening bolt 160 is configured to move in the axial direction to selectively engage with the pulley 110. The tightening bolt 160 engaged with the pulley 110 is configured to rotate together with the pulley 110.

The tightening bolt 160 may include a gear portion 161 provided to engage with the internal gear portion 113 of the pulley 110, a first clip groove 162, a second clip groove 162, a c-ring groove 164 provided to fit the c-ring 180, and a fastening portion 165 coupled to the fastening device to rotate the tightening bolt 160.

As shown in FIG. 10, the tightening bolt 160 may move axially downward and engage with the pulley 110. At this time, the gear portion 161 of the tightening bolt 160 and the internal gear portion 113 of the pulley 110 are engaged with each other and the pulley 110 can be rotated together by rotating the tightening bolt 160.

As shown in FIG. 11, the tightening bolt 160 may move axially upward and be disengaged from the pulley 110. At this time, the gear portion 161 of the tightening bolt 160 may not engage with the internal gear portion 113 of the pulley 110 and therefore the pulley 110 may not rotate even when the tightening bolt 160 is rotated.

After a coupling between the door trim 20 and the door panel 30 is completed, the tightening bolt 160 can be disengaged from the pulley 110 to prevent the user from unintentionally releasing the coupling between the door trim 20 and the door panel 30 by rotating the pulley 110.

Figure 12:
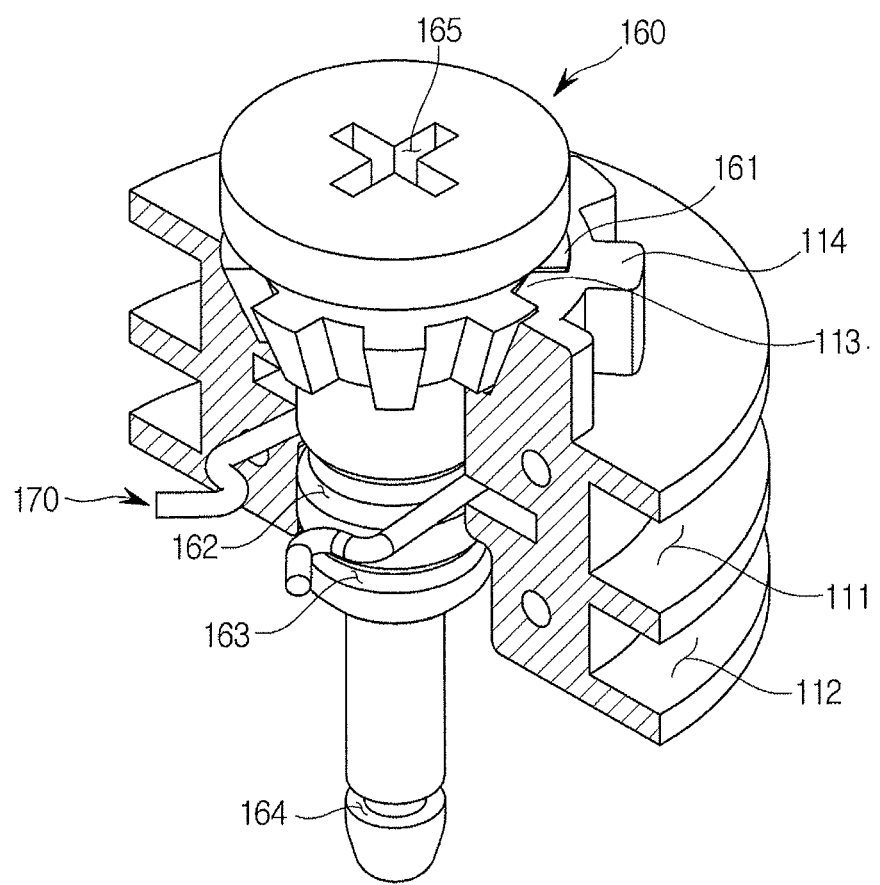
FIG. 12 is a view illustrating a state in which a clip is inserted into a first clip groove of a tightening bolt in a door trim coupling device for a vehicle according to an exemplary embodiment of the present invention.
Figure 13:
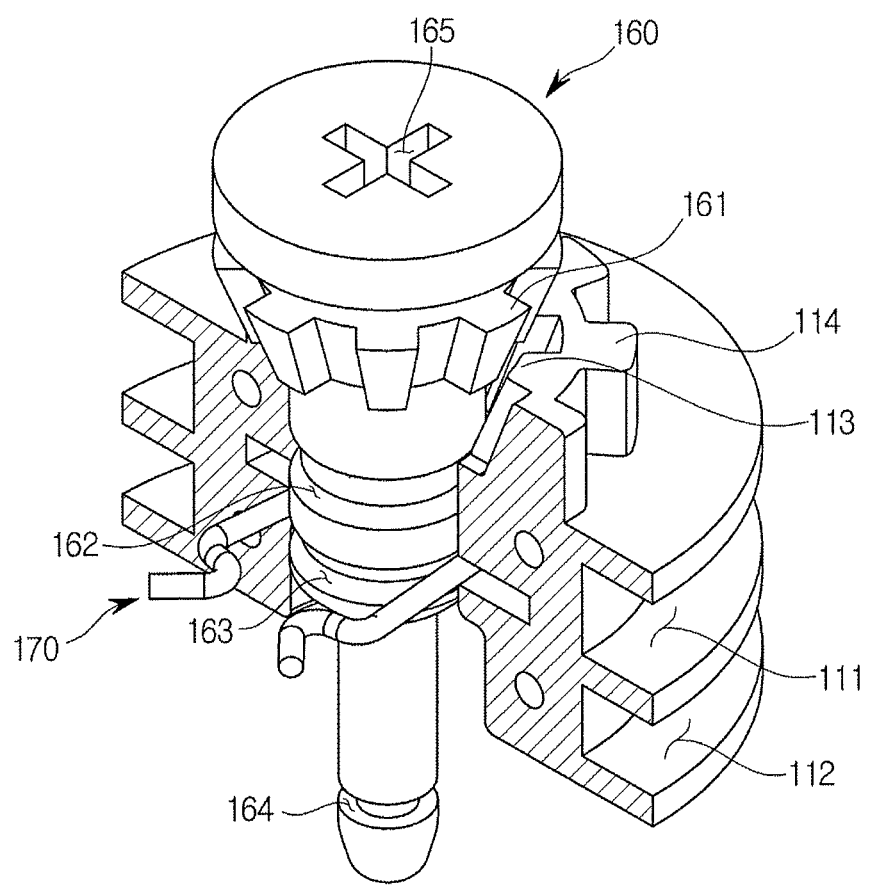
FIG. 13 is a view illustrating a state in which a clip is inserted into a second clip groove of a tightening bolt in a door trim coupling device for a vehicle according to an exemplary embodiment of the present invention.

FIG. 12 is a view illustrating a state in which a clip is inserted into a first clip groove of a tightening bolt in a door trim coupling device for a vehicle according to an exemplary embodiment of the present invention and FIG. 13 is a view illustrating a state in which a clip is inserted into a second clip groove of a tightening bolt in a door trim coupling device for a vehicle according to an exemplary embodiment of the present invention.

The locking device 100 may further include a clip 170 selectively fitted to either a first clip groove 162 or a second clip groove 163 of the tightening bolt 160.

As shown in FIG. 12, the clip 170 can be fitted into the first clip groove 162. At this time, the tightening bolt 160 may be in a state of being engaged with the pulley 110.

As shown in FIG. 13, the clip 170 can be fitted into the second clip groove 163. At this time, the tightening bolt 160 may be in a state of being disengaged from the pulley 110.

By providing the clip 170, the tightening bolt 160 of the present invention can be positioned at one of two positions, in a state of being engaged with the pulley 110 or in a state of being disengaged from the pulley 110. That is, the clip 170 can serve as a reference point for determining the position of the tightening bolt 160 in the axial direction. When the clip 170 is not provided, the tightening bolt 160 can move freely in the axial direction, and even when the state in which the tightening bolt is disengaged from the pulley is intended to be maintained, such a state cannot be easily maintained.

Figure 14:
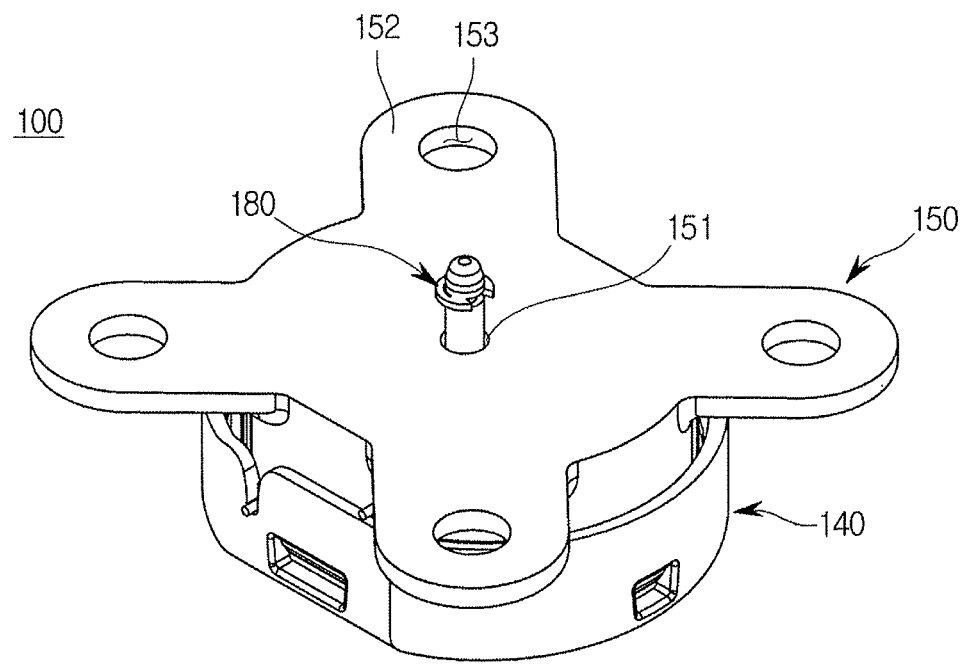
FIG. 14 is a bottom view of a locking device in a door trim coupling device for a vehicle according to an exemplary embodiment of the present invention.

FIG. 14 is a bottom view of a locking device in a door trim coupling device for a vehicle according to an exemplary embodiment of the present invention.

The locking device 100 may further include a lower housing 150 including a bracket 152 provided to be disposed in the door trim 20 and a through hole 151 provided to be penetrated by the tightening bolt 160, and a c-ring 180 configured to prevent the tightening bolt 160 from being separated from the through hole 151.

The locking device 100 can be mounted on the door trim 20 by engaging the bracket 152 of the lower housing 150 with the door trim 20. At this time, a fastening member can be inserted into the fastening hole 153 of the bracket 152. However, this is only one example, and the locking device can be mounted on the door trim by various fastening methods.

As shown in FIG. 14, the through hole 151 may be larger than the external diameter of the tightening bolt 160. Therefore, the tightening bolt 160 can pass through the through hole 151.

The c-ring 180 may be fitted in a c-ring groove 164 provided at the lower end portion of the tightening bolt 160. Since the external circumference of the c-ring 180 is larger than the through hole 151, it is possible to prevent the tightening bolt 160 from being separated from the locking device 100 through the through hole 151 by fitting the c-ring 180 into the tightening bolt 160. That is, it is possible to prevent the tightening bolt 160 from being lost.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door trim coupling device for a vehicle, the door trim coupling device comprising:
    at last one wire provided in at least one closed loop form;
    a locking device disposed in a door trim of the vehicle and configured to selectively wind or unwind the at least one wire; and
    a mounting device disposed in the door trim and configured to be engaged with or disengaged from a door panel of the vehicle by winding or unwinding of the at least one wire;
    wherein the locking device includes:
        a pulley provided to be rotatable and configured to wind or unwind the at least one wire according to a rotation direction of the pulley, and
        a clutch configured to allow the pulley to rotate in a first direction and to prevent the pulley from rotating in a second direction opposite to the a first direction.

2. The door trim coupling device according to claim 1, wherein the clutch comprises a first clutch and a second clutch selectively connectable to the pulley, and
    the first clutch allows the pulley to rotate in the first direction and prevents the pulley from rotating in the second direction opposite to the first direction and
    the second clutch prevents the pulley from rotating in the first direction and allows the pulley to rotate in the second direction.

3. The door trim coupling device according to claim 2, wherein the locking device further includes a clutch housing to which the first clutch and the second clutch are coupled to each other, and
    the clutch housing is configured to be selectively disposed at a first position in which the first clutch is connected to the pulley or at a second position in which the second clutch is connected to the pulley.

4. The door trim coupling device according to claim 3, wherein the locking device further includes an upper housing to which the clutch housing is coupled, and
    the upper housing includes a first positioning groove for positioning the clutch housing in the first position and a second positioning groove for positioning the clutch housing in the second position.

5. The door trim coupling device according to claim 4, wherein the clutch housing includes a positioning protrusion configured to be selectively inserted into one of the first positioning groove and the second positioning groove.

6. The door trim coupling device according to claim 1, wherein the at least one closed loop includes a first loop and a second loop,
    wherein the at least one wire includes a first wire and a second wire, each of which forms the first loop and the second loop separately, and
    when the first wire is wound around the pulley, the second wire is configured to be unwound from the pulley and when the first wire is unwound from the pulley, the second wire is configured to be wound around the pulley.

7. The door trim coupling device according to claim 6, wherein when the pulley rotates in the first direction, the first wire is wound around the pulley and
    when the pulley rotates in the second direction opposite to the first direction, the first wire is unwound from the pulley.

8. The door trim coupling device according to claim 1, wherein the locking device further includes a tightening bolt configured to be movable in an axial direction thereof, and
    the tightening bolt is configured to move in the axial direction thereof to selectively engage with the pulley and the tightening bolt engaged with the pulley is configured to rotate together with the pulley.

9. The door trim coupling device according to claim 8, wherein the locking device further includes a clip, and
    the clip is selectively fitted in a pair of clip grooves provided at an axially upper side and an axially lower side of the tightening bolt.

10. The door trim coupling device according to claim 8, wherein the locking device further includes:

a lower housing disposed in the door trim and including a through hole provided to be penetrated by the tightening bolt; and a c-ring coupled to a first end portion of the tightening bolt to prevent the tightening bolt from being separated from the through hole.

* * * * *